United States Patent [19]
Gillespie et al.

[11] Patent Number: 5,513,337
[45] Date of Patent: Apr. 30, 1996

[54] SYSTEM FOR PROTECTING UNAUTHORIZED MEMORY ACCESSES BY COMPARING BASE MEMORY ADDRESS WITH MASK BITS AND HAVING ATTRIBUTE BITS FOR IDENTIFYING ACCESS OPERATIONAL MODE AND TYPE

[75] Inventors: Byron R. Gillespie, Phoenix; Elliot D. Garbus, Scotsdale, both of Ariz.; Mitchell A. Kahn, San Jose, Calif.; Thomas M. Johnson, Tempe, Ariz.; Dennis M. O'Connor, Chandler, Ariz.; Jay S. Heeb, Gilbert, Ariz.

[73] Assignee: Intel Corporation, Santa Clara, Calif.

[21] Appl. No.: 249,011

[22] Filed: May 25, 1994

[51] Int. Cl.$^6$ .................................................. G06F 12/14
[52] U.S. Cl. .......................... 395/479; 395/490; 395/186; 364/246.6; 364/246.7; 364/246.8; 364/259.7; 364/DIG. 1; 364/969; 364/969.1; 364/969.2; 364/969.4
[58] Field of Search .................... 395/800, 425, 395/400, 575, 479, 490, 186; 364/DIG. 1, DIG. 2

[56] References Cited

U.S. PATENT DOCUMENTS

| | | | |
|---|---|---|---|
| 3,573,855 | 4/1971 | Cragon | 395/425 |
| 4,488,256 | 12/1984 | Zolnowsky et al. | 395/400 |
| 4,926,316 | 5/1990 | Baker et al. | 395/425 |
| 5,051,889 | 9/1991 | Fung et al. | 395/425 |
| 5,097,445 | 3/1992 | Yamauchi | 365/195 |

*Primary Examiner*—Meng-Al An
*Attorney, Agent, or Firm*—Blakely, Sokoloff, Taylor & Zafman

[57] ABSTRACT

The system and method described provide for the detection and protection of memory accesses without the overhead typically incurred by memory management units. The processor includes a guarded memory unit, which monitors memory accesses to be performed by monitoring transmissions across the memory bus. The guarded memory unit includes a plurality of registers which identify memory addresses and modes which can cause a memory protection or detection violation to occur. If a memory protection violation occurs, a cancel signal is issued to cancel the memory operation prior to completion in order to protect the memory from unauthorized accesses. If a memory violation is detected, the memory operation is permitted to complete and a fault signal is issued to the processor to identify that a memory violation has been detected. As the structure of the protection mechanism does not require separate cycles in the processor, and simply monitors the memory bus for memory accesses, memory protection and detection can be performed with no additional overhead at the processor.

2 Claims, 15 Drawing Sheets

| Register Name | GMU Register Description | Address |
| --- | --- | --- |
| GCR | Control Register | FF008000 |
| MPAR0 | Memory Protection Address Register 0 | FF00 8010 |
| MPMR0 | Memory Protection Mask Register 0 | FF00 8014 |
| MPAR1 | Memory Protection Address Register 1 | FF00 8018 |
| MPMR1 | Memory Protection Mask Register 1 | FF00 801C |
| MDUB0 | Memory Detect Upper Bounds Address Register 0 | FF00 8080 |
| MDLB0 | Memory Detect Lower Bounds Address Register 0 | FF00 8084 |
| MDUB1 | Memory Detect Upper Bounds Address Register 1 | FF00 8088 |
| MDLB1 | Memory Detect Lower Bounds Address Register 1 | FF00 808C |
| MDUB2 | Memory Detect Upper Bounds Address Register 2 | FF00 8090 |
| MDLB2 | Memory Detect Lower Bounds Address Register 2 | FF00 8094 |
| MDUB3 | Memory Detect Upper Bounds Address Register 3 | FF00 8098 |
| MDLB3 | Memory Detect Lower Bounds Address Register 3 | FF00 809C |
| MDUB4 | Memory Detect Upper Bounds Address Register 4 | FF00 80A0 |
| MDLB4 | Memory Detect Lower Bounds Address Register 4 | FF00 80A4 |
| MDUB5 | Memory Detect Upper Bounds Address Register 5 | FF00 80A8 |
| MDLB5 | Memory Detect Lower Bounds Address Register 5 | FF00 80AC |

*Figure 6*

| Mask Value | Block Size | Mask Value | Block Size |
|---|---|---|---|
| FFFF FF00 | 256 Bytes | FFF0 0000 | 1M Bytes |
| FFFF FE00 | 512 Bytes | FFE0 0000 | 2M Bytes |
| FFFF FC00 | 1K Bytes | FFC0 0000 | 4M Bytes |
| FFFF F800 | 2K Bytes | FF80 0000 | 8M Bytes |
| FFFF F000 | 4K Bytes | FF00 0000 | 16M Bytes |
| FFFF E000 | 8K Bytes | FE00 0000 | 32M Bytes |
| FFFF C000 | 16K Bytes | FC00 0000 | 64M Bytes |
| FFFF 8000 | 32K Bytes | F800 0000 | 128M Bytes |
| FFFF 0000 | 64K Bytes | F000 0000 | 256M Bytes |
| FFFE 0000 | 128K Bytes | E000 0000 | 512M Bytes |
| FFFC 0000 | 256K Bytes | C000 0000 | 1G Bytes |
| FFF8 0000 | 512K Bytes | 8000 0000 | 2G Bytes |

*Figure 8*

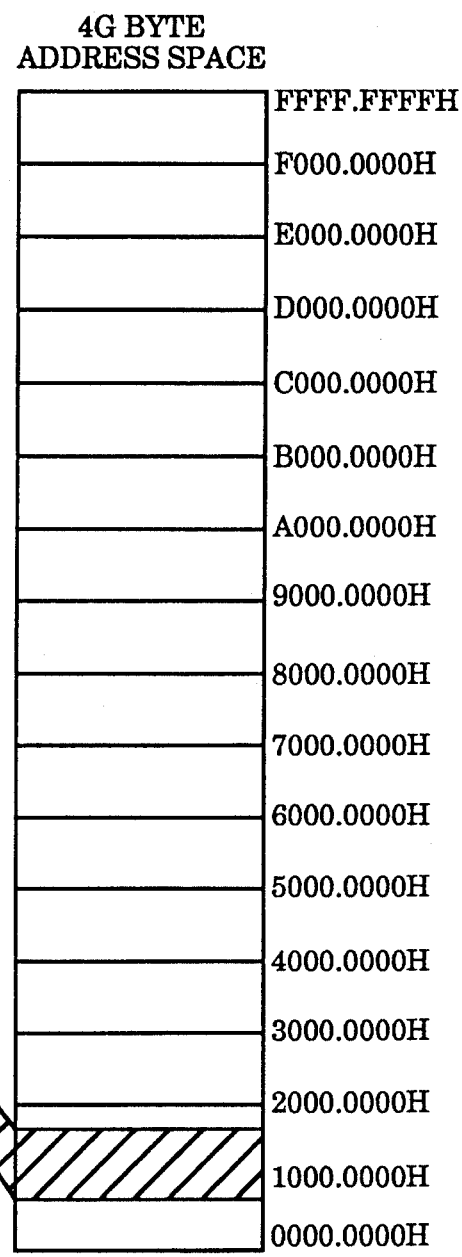
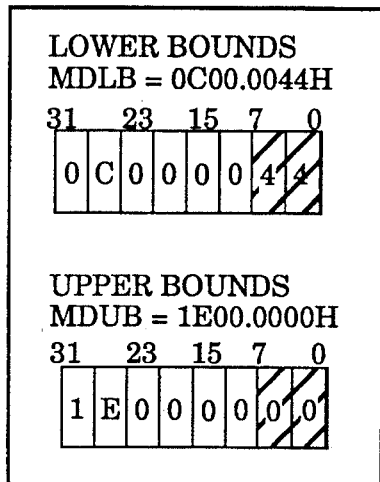
| PROTECTED RANGE | |
|---|---|
| START ADDRESS | END ADDRESS |
| 0C00.0000H | 1DFF.FFFFH |
| START ADDRESS | GMU ACTIONS |
|---|---|
| USER MODE READ | NONE |
| USER MODE WRITE | NONE |
| USER MODE EXECUTE | FAULT |
| SUPERVISOR MODE READ | NONE |
| SUPERVISOR MODE WRITE | NONE |
| SUPERVISOR MODE EXECUTE | FAULT |
*Figure 11*

SYSTEM FOR PROTECTING UNAUTHORIZED MEMORY ACCESSES BY COMPARING BASE MEMORY ADDRESS WITH MASK BITS AND HAVING ATTRIBUTE BITS FOR IDENTIFYING ACCESS OPERATIONAL MODE AND TYPE

BACKGROUND OF THE INVENTION

1. Field of the Invention

The system and method of the present invention relates to the protection of memory from unauthorized access with no performance penalty. More particularly, the system and method of the present invention relates to the protection of memory in a non-virtual memory based system, such as embedded controllers.

2. Art Background

As the sophistication of computer processors and controllers increases so does the software to operate the processors and controllers. To program the processors and controllers today requires typically a group of programmers to develop the code to operate the processor or controller. Typically, a team of programmers will work on development concurrently on different portions of the code. Mistakes typically occur during development, as well as conflicts of memory usage. Therefore, it is desirable to be able to flexibly protect specific areas of memory. For example, if a certain portion of the code has been tested and proven to be running accurately, it may be desirable to protect that code from any further modification, deliberately or inadvertently. Further, it is desirable to protect certain areas of memory used by certain portions used by the code from access by other portions of the code to minimize errors during development.

In a microprocessor based system having virtual memory, the memory management unit (MMU) not only provides the function of mapping virtual memory accesses to physical memory accesses but also performs a check of the protection on the different portions of the memory. Therefore, certain portions of the memory can be specified as protected against certain accesses, for example, certain processes cannot access certain portions of memory.

However, the MMU incurs significant overhead for each access as the process of performing a virtual to physical address translation is quite time consuming. This penalty is acceptable for the benefit of providing virtual memory access. Embedded controllers, or microprocessors, however, do not require the flexibility of virtual addressing as the application the controller/microprocessor performs is very specific and is typically not changed in a manner that requires the flexibility of virtual addressing. The embedded controllers and microprocessors are coded during development using physical addresses as this is much quicker and less hardware and software overhead is required.

Therefore not all microprocessors and controllers include an MMU as virtual addressing is not performed and these microprocessors/controllers do not provide for a memory protect mechanism. Further, as the code required to operate the controllers/microprocessors has become more and more complex, requiring more and more programmers to develop the code, the need to provide some form of a protection mechanism has become apparent. In addition, it is desirable that the protection mechanism does not cause the processor to lose performance or incur any overhead in providing this protection mechanism.

SUMMARY OF THE INVENTION

It is therefore an object of the present invention to provide a memory protection mechanism that prohibits unauthorized access to memory with little or no performance penalty.

It is further an object of the present invention to provide a memory protection mechanism that is fast, low cost, and detects and prohibits unauthorized accesses to memory.

In the system of the present invention, a guarded memory unit is included in the controller/processor to protect and detect against unauthorized accesses to memory. The guarded memory unit monitors the memory bus for the memory access requests issued. The guarded memory unit preferably includes a plurality of protection register pairs and detection register pairs which stores the protection and detection information required to determine whether accesses being transmitted across the memory bus are authorized or unauthorized. This mechanism operates with little or no overhead visible at the processor such that no performance penalties are incurred to provide this additional capability.

These registers are programmable thereby providing flexibility in determining accesses which are unauthorized. The guarded memory unit therefore monitors each memory access request issued on the memory bus. A comparison is then determined based on the values in the registers as to whether a memory protection violation or a memory detection violation has occurred at the specified address. If a memory protection violation has occurred, based on the comparisons performed with the information in the protection registers, the guarded memory unit issues a signal to stop the memory access from executing. An internal fault is also generated to the processor core to notify the core of the protection violation. The core acknowledges the fault and thereafter branches to a fault-handling routine to address the memory protection violation.

Alternately, the guarded memory unit may detect a memory detection violation. A memory detection violation will not abort the memory access but rather will simply report that a violation has occurred. Thus, when the guarded memory unit detects a memory detection violation a fault is generated to the processor to notify the processor that a detection violation has occurred. The processor at that time will then branch to a fault handling routine to process the fault. Thus, a simple non-intrusive mechanism is provided to protect and/or detect against memory violations which may occur.

BRIEF DESCRIPTION OF THE DRAWINGS

The objects, features and advantages the present invention will be apparent to one skilled in the art from the following detailed description in which:

FIG. 6 is a table illustrating one embodiment of the registers utilized in the guarded memory unit of FIG. 4.

FIG. 8 is a table illustrating the memory mask register and the potential block sizes that can be protected in accordance with the teachings of the present invention.

FIG. 11 illustrates one example of programming the detection registers to detect unauthorized accesses.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The memory protection and detection system of the present invention provides for a non-intrusive, no-overhead method and apparatus for detecting memory violations and protecting against memory violations. The system and method will be described in the context of an embedded controller; however, it is readily apparent that the system and method is applicable to various types of microprocessors and controllers which require a memory detection and/or protection mechanism.

Figure 1:
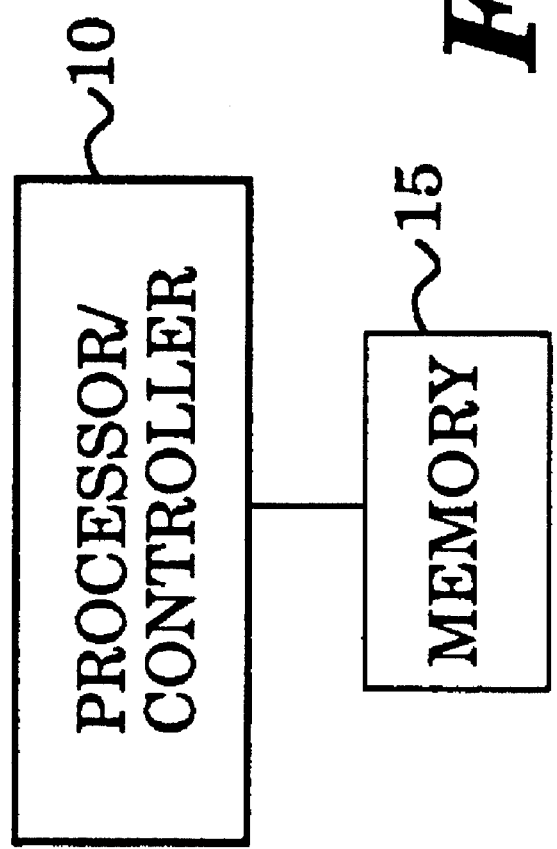
FIG. 1 is a simplified block diagram of the system of the present invention which includes a processor/controller and memory, which is protected in accordance with the teachings of the present invention.

A simplified block diagram of the system is shown in FIG. 1. The processor or controller (hereinafter referred to as a processor) is coupled to memory 15. The system and method of the present invention will prevent unauthorized accesses to the memories as well as detect memory violations that may occur during processing.

Figure 2:
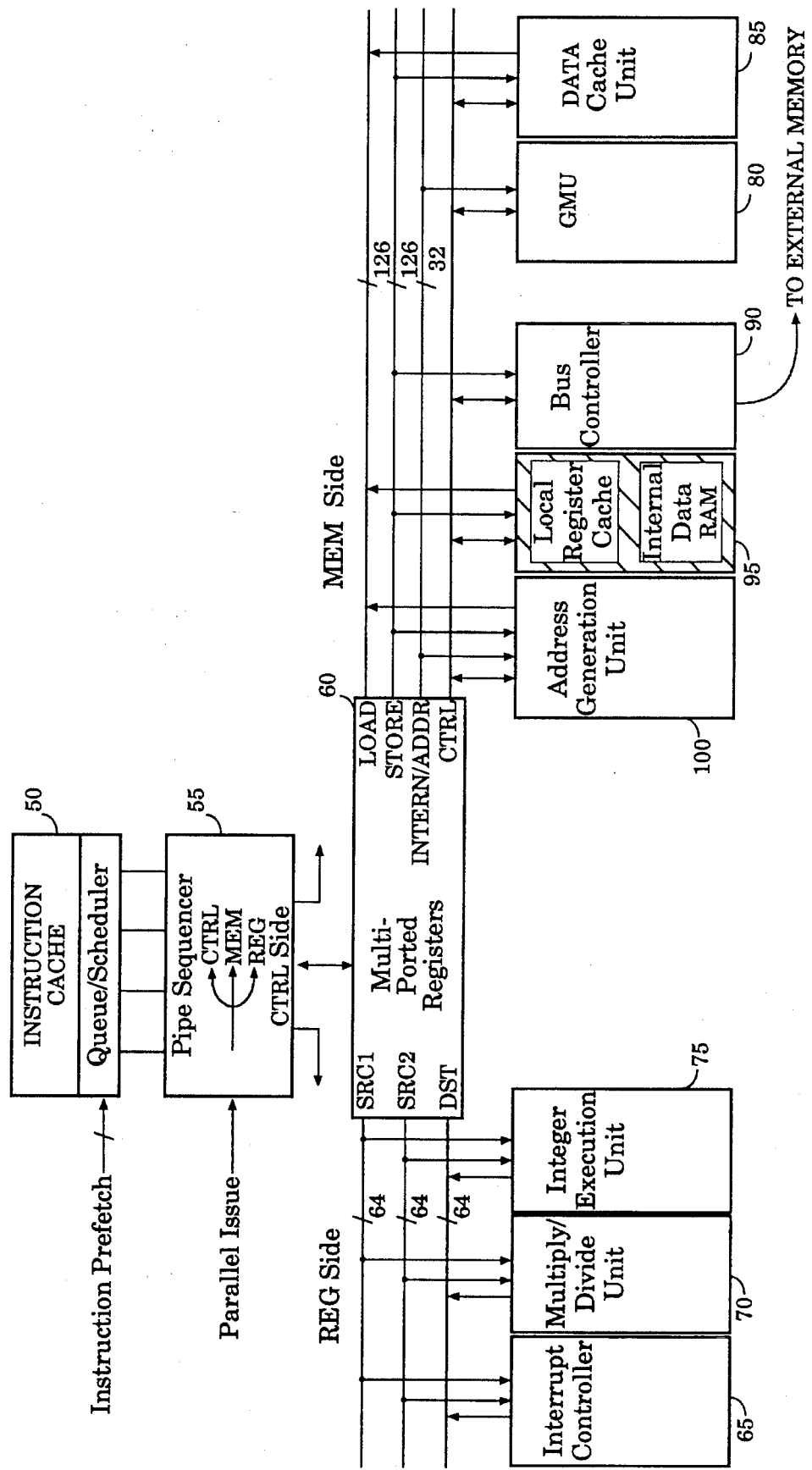
FIG. 2 is a simplified block diagram of the processor/controller which includes the guarded memory unit for protecting against memory violations.

A more detailed block diagram of one embodiment of the system is shown in FIG. 2. The instruction unit 50, in the present embodiment, is shown to include an instruction cache and instruction queue/scheduler, for scheduling instructions into the pipe sequencer 55. In the present embodiment, the pipe sequencer 55 issues control, memory and register instructions in parallel to the multi-ported registers 60 for distribution to the appropriate elements 65, 70, 75, 100, 95, 90, 85 for execution. In the present embodiment, these elements include interrupt controller 65, multiply/divide unit 70, integer execution unit 75, address generation unit 100, local register cache/internal data RAM 95, bus controller 90 and data cache unit 85. It is readily apparent to one skilled in the art that this structure is exemplary and different processor structures may be used. Also included in the processor is a guarded memory unit (GMU 80). The guarded memory unit 80 is also coupled to memory bus 60 in such a manner that the GMU 80 can monitor memory access requests issued on the bus 60.

The GMU 80 monitors the accesses in order to detect memory violations and identify memory protection violations as well as memory detect violations. A memory protection violation causes the GMU 80 to cancel the current memory request in order to prevent the memory violation from occurring. Furthermore, a fault is issued to the instruction unit 50 to notify the instruction unit 50 that a memory protection violation has occurred. In addition, in the present embodiment, a mechanism to simply detect certain memory violations is also provided. If a memory violation is detected, the memory operation is permitted to complete but a fault is generated by the GMU 80 to the instruction unit 50 to notify the instruction unit 50 that a memory violation has been detected.

Figure 3A:
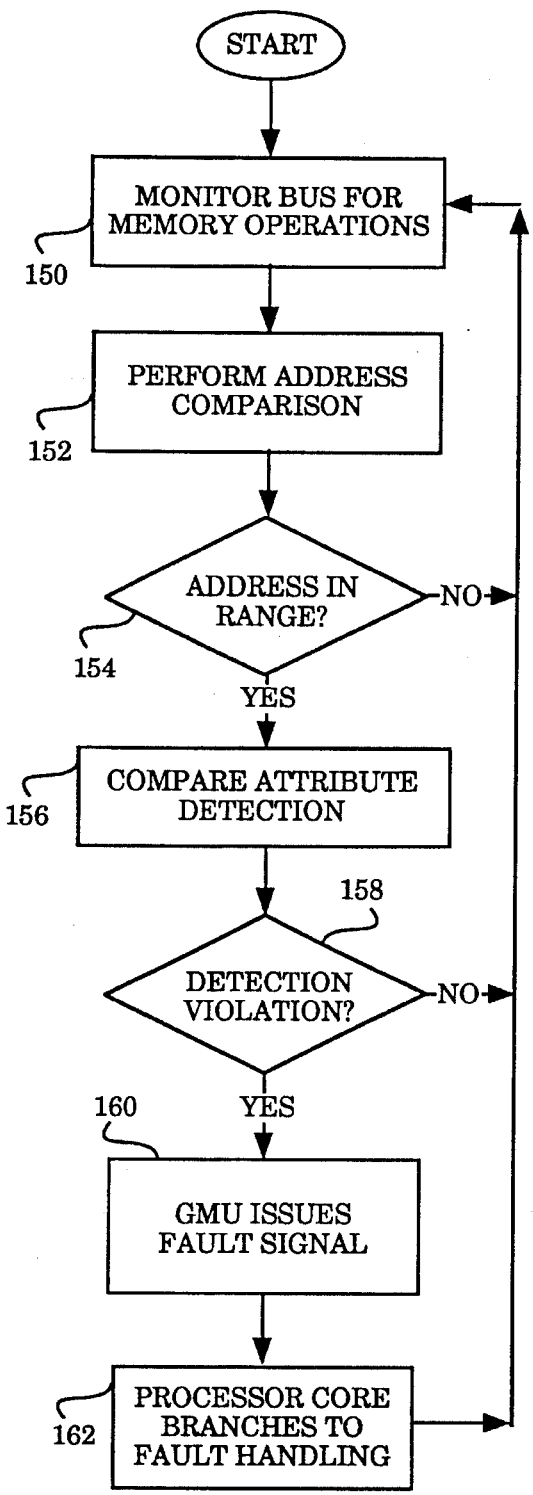
FIGS. 3a, 3b and 3c are simplified flow diagrams showing embodiments of the process of the present invention.
Figure 3B:
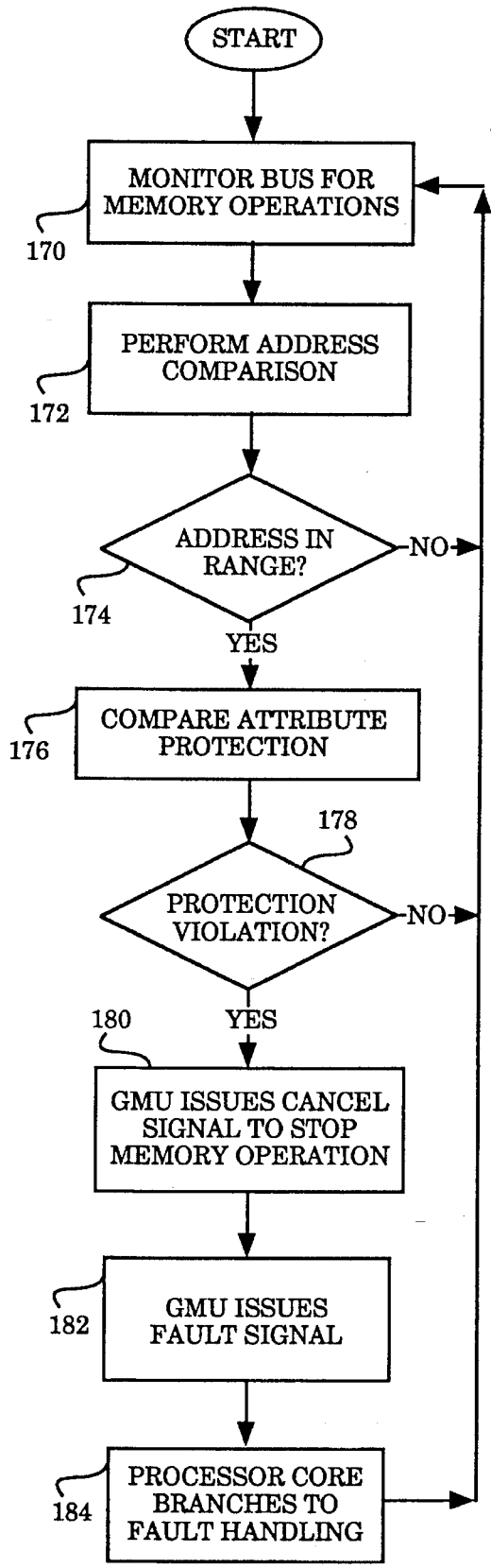
Figure 3C:
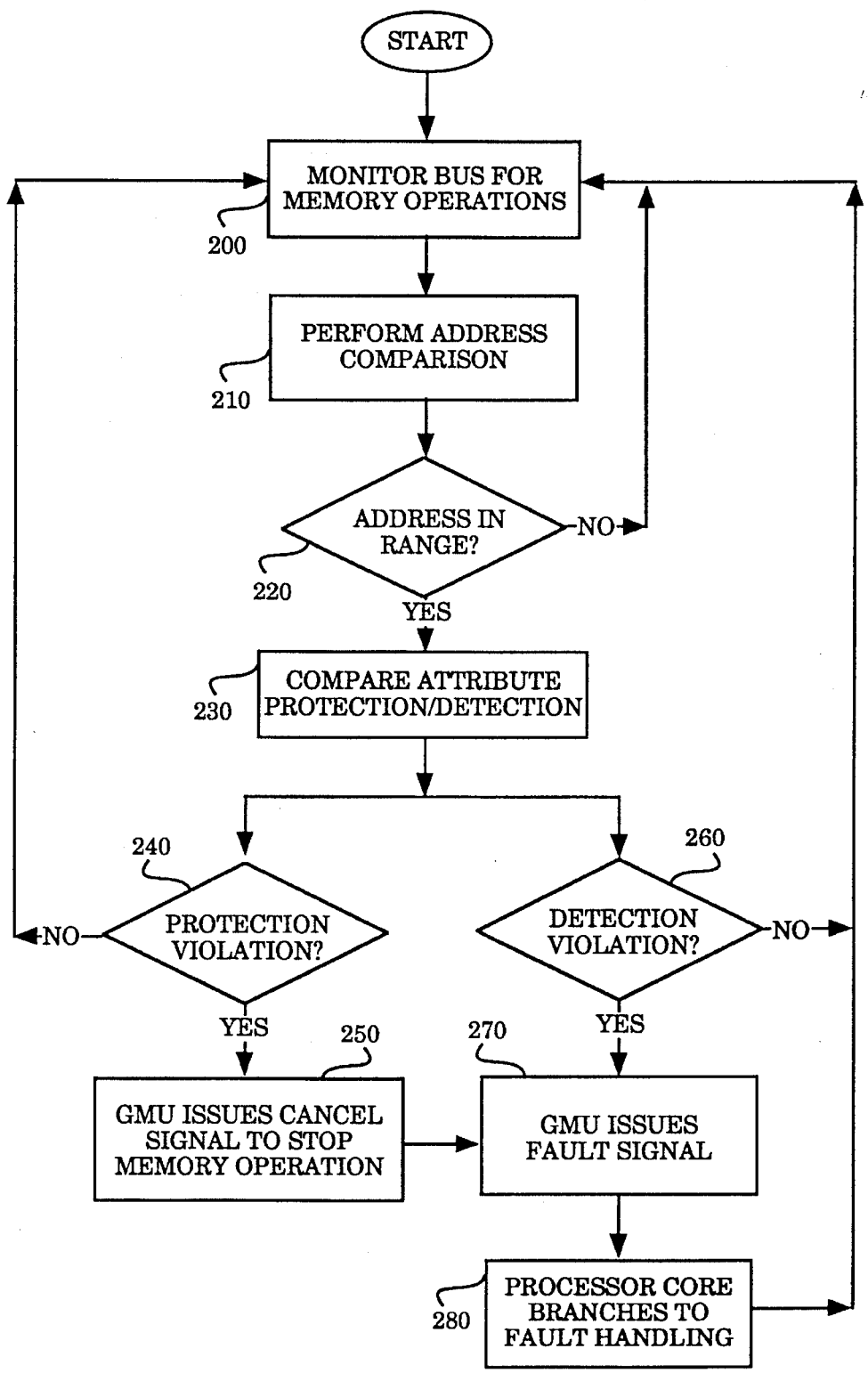

The process is best explained with reference to the simplified flowcharts of FIGS. 3a, 3b, 3c. FIG. 3a illustrates the process for detection of memory violations. At step 150, the bus is monitored for transmission of signals indicative of the initiation of a memory operation, such as a memory request. At step 152, when a memory operation is detected, an address comparison is performed to determine if the address of the memory operation is within an address range identified to be a memory violation. If the address is within the address range, step 154, the memory operation attributes are compared to attributes, for example the type of operation or mode of access, indicative of a violation. If the attributes match, step 158, the GMU issues a fault signal, step 160, back to the CPU, in the present embodiment, the instruction unit of the CPU, to report the detection of a memory violation. In response to the fault signal, the processor core branches to a fault handling routine to address the memory violation. The fault handling routine may simply generate a report of the violation or perform a specific process to minimize the effect of the memory violation.

The memory protection process differs from the memory detection process as the memory protection process prevents specified memory operations from occurring. Referring the FIG. 3b, at step 170 the GMU monitors the bus for the occurrence of memory operations. An address comparison is then performed to determine if the address of the memory operation to be performed is within the range of protected memory addresses, step 172. If the address is within the range, step 174, the attributes of the memory operation are compared to the attributes indicative of a memory violation, step 176. If the attributes match, a protection violation has occurred, step 178, and the GMU issues a cancel signal to stop the execution of the memory operation, step 180. In the preferred embodiment the cancel signal is issued to the bus control unit over the CTRL signal lines. Upon receipt of the cancel signal, the bus control unit aborts the memory operation. At step 182, the GMU issues a fault signal to report the memory protection violation and the processor, in response to the fault signal, branches to the corresponding fault handling routine, step 184.

Preferably the system performs both memory detection of violations and memory protection of violations. The process can be initialized such that memory at certain identified addresses having certain attributes are protected against memory violations while memory violations at other addresses are simply detected and reported to the processor. This process is described with reference to FIG. 3c. Referring to FIG. 3c, at step 200, the GMU monitors the bus for memory operations, specifically, memory requests issued by the instruction unit. When a memory request is issued, step 210, the address of the request is compared to the addresses in the protection and detection registers in the guarded memory unit., which indicate those memory addresses to which limited access is provided. If the address is not in the range of the addresses in the registers, step 220, then the memory request is allowed to be processed and the guarded memory unit continues to monitor the bus for subsequent memory operations. If the address of the memory request is in the range of the addresses specified by the protection or detection registers, at step 230, the attributes of the memory operation are compared to the attributes set in the protection or detection registers to determine if the access is authorized. Such attributes include, for example, whether the operation is taking place in user mode or supervisor mode, or whether a read, write, or execute operation is being performed.

If there is a protection violation, step 240, the GMU issues a cancel signal to the bus control unit to stop the memory operation from completing. This protects the memory from the actual unauthorized access, step 250. If a detection violation occurs, step 260, the memory operation is permitted to complete and the GMU issues a fault signal 270 to the instruction scheduler of the processor to notify the processor of the memory detection violation. Similarly, the GMU issues a fault signal to the instruction unit when a protection violation occurs to likewise notify the instruction unit of the violation. The instruction unit, step 280, branches to fault handling routines to service the fault received. Thus, a simple non-intrusive but effective mechanism is provided for detecting as well as protecting against memory violations.

Figure 4:
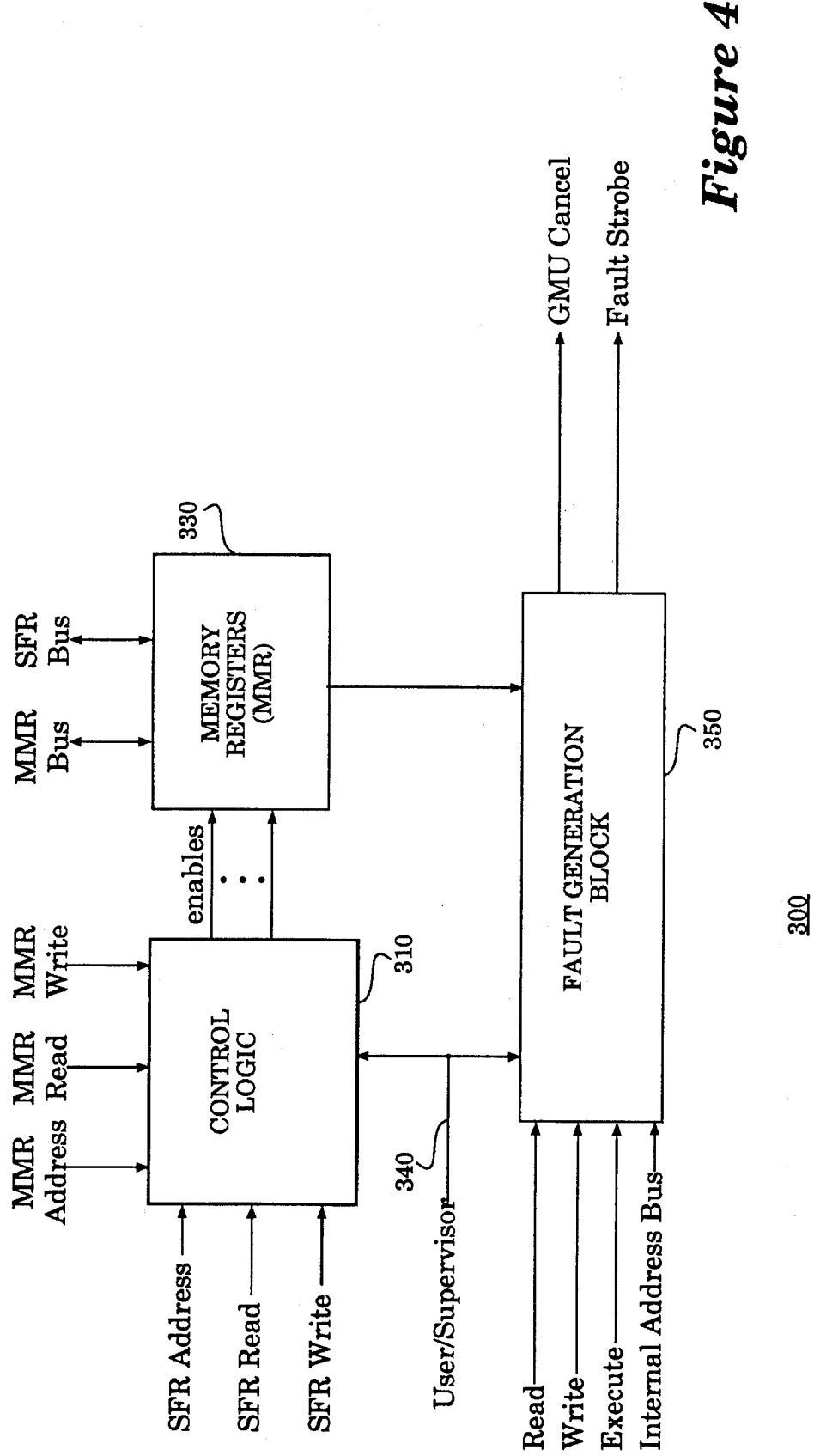
FIG. 4 is a block diagram of one embodiment of the guarded memory unit of the present invention.

A simplified block diagram of one embodiment of the guarded memory unit is shown in FIG. 4. The guarded memory unit includes a plurality of programmable registers 300, herein referred to as memory mapped registers (MMR). The registers 300 are programmed to identify the addresses and other attributes of a memory operation which cause a memory violation.

One embodiment of the memory mapped registers is shown in FIG. 6. Preferably, the registers include a control register, two pair of memory protection registers and six pair of memory detect registers. It is readily apparent that the configuration shown herein is exemplary and other configurations may be used. For example, the registers may include all memory protection registers whereby the system protects against memory violations from occurring. Similarly, the registers may include solely memory detect registers whereby the mechanism detects memory violations only. Furthermore, different amounts of memory protect registers and memory detect registers may be utilized by appropriate configuration of the registers.

These registers are controlled and programmed by the control circuit 310, which receives as input address and read/write control information to perform read and write operations to the registers. In the present embodiment the control logic circuit 310 for the receives as input MMR read, MMR write, MMR address, SFR read, SFR write, and SFR address signals to read and write to the memory and special function registers (SFR), respectively. Also input to circuit 310, as well as fault generation block 350, is a supervisor user mode signal 340 to identify whether the processor is executing in supervisor or user mode. Circuit 310 receives the inputs and generates multiple enable signals to the MMR registers to perform MMR access or SFR access to direct the data to or from the memory registers.

The memory register block 330 receives as input the SFR data bus, MMR data bus, and the enable signals from control logic circuit 310. The enable signals control the acceptance of data for writing to the registers or the output of data from reading the registers to or from the SFR data bus or MMR data bus. Preferably memory register block 330 contains multiple registers as defined in FIG. 6 and provides an output to the fault mode generation block 350.

The fault mode generation block 350 receives as input the memory register values from memory register block 330 and information about the current bus access to be compared. This input preferably contains the current access read input, write input, execute input, internal address bus and the user supervisor input. This fault generation block 350 performs the comparisons and outputs the GMU cancel and GMU fault strobe output when a violation occurs. Further breakdown of this block is illustrated in FIG. 5.

Figure 5:
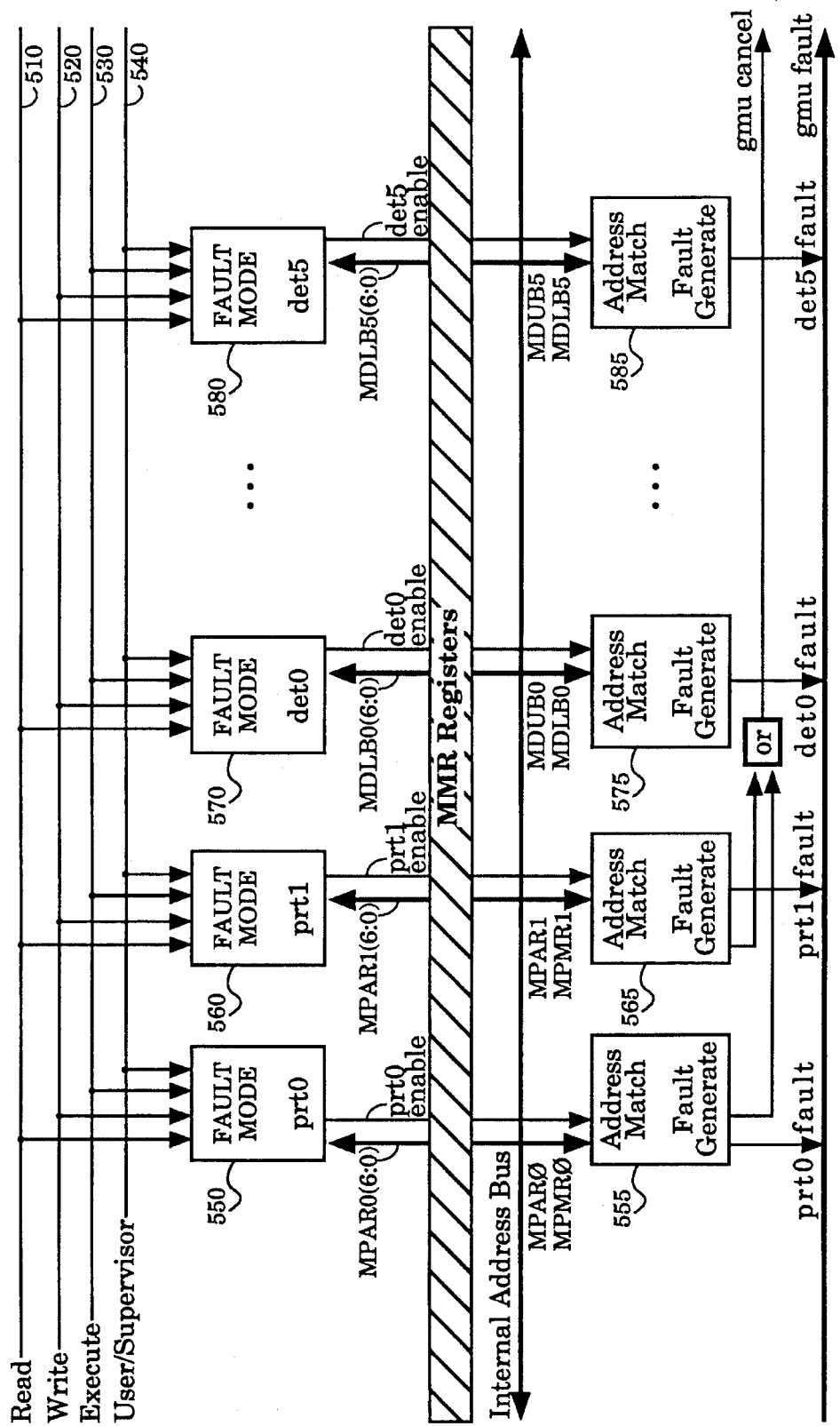
FIG. 5 is a block diagram illustrating one embodiment of a fault generation block found in the guarded memory unit of the embodiment of FIG. 4.

One embodiment of the fault generation block is illustrated in FIG. 5. Referring to FIG. 5, the block consists of multiple fault mode circuits, 550, 560, 570, 580 and address match circuits 555, 565, 575, 585. Each fault mode circuit receives as input the read input, write input, execute input, the user/supervisor input and the current internal address accessed. The fault mode circuits also receive the corresponding memory protection address register bits which contain memory operation attribute information, in the present embodiment, bits 0–6. This first fault mode circuit 550 also receives from the memory registers, the corresponding attribute information, MPARO (bits 0 through 6), to determine if the attributes of the current access match the attributes identified in the MPARO MMR register. If a match occurs, the fault mode circuit generates an enable output which goes to the corresponding address match circuits 555, 565, 575, 585.

The address match fault generate block also receives as input the address of the memory operation to be performed, from the internal address bus and the address range identified in the memory registers. For example, the first address match circuit 555 receives as input MPARO, MPMRO from the memory registers, the internal address and the enable from the fault mode block 550. The address match fault generate block compares the address and if the address is one specified by the registers and the enable signal has been issued, a fault output signal and a GMU cancel output signal are generated. The first fault mode circuit 550 and address match circuit 555 function to perform a memory protection operation. Similar processes occur in the circuits which function to perform a memory violation detection operation. For example, fault mode circuit 570 and address match circuit 575 function to perform a memory violation detection operation. If a memory violation is detected, a fault output signal is generated. By providing a plurality of fault mode detection circuits 455, 460, 465, 470, the memory detection and protection comparisons can be performed in parallel. It is readily apparent that a serial method and mechanism may also be employed by appropriate modification to the circuit shown.

Figure 7:
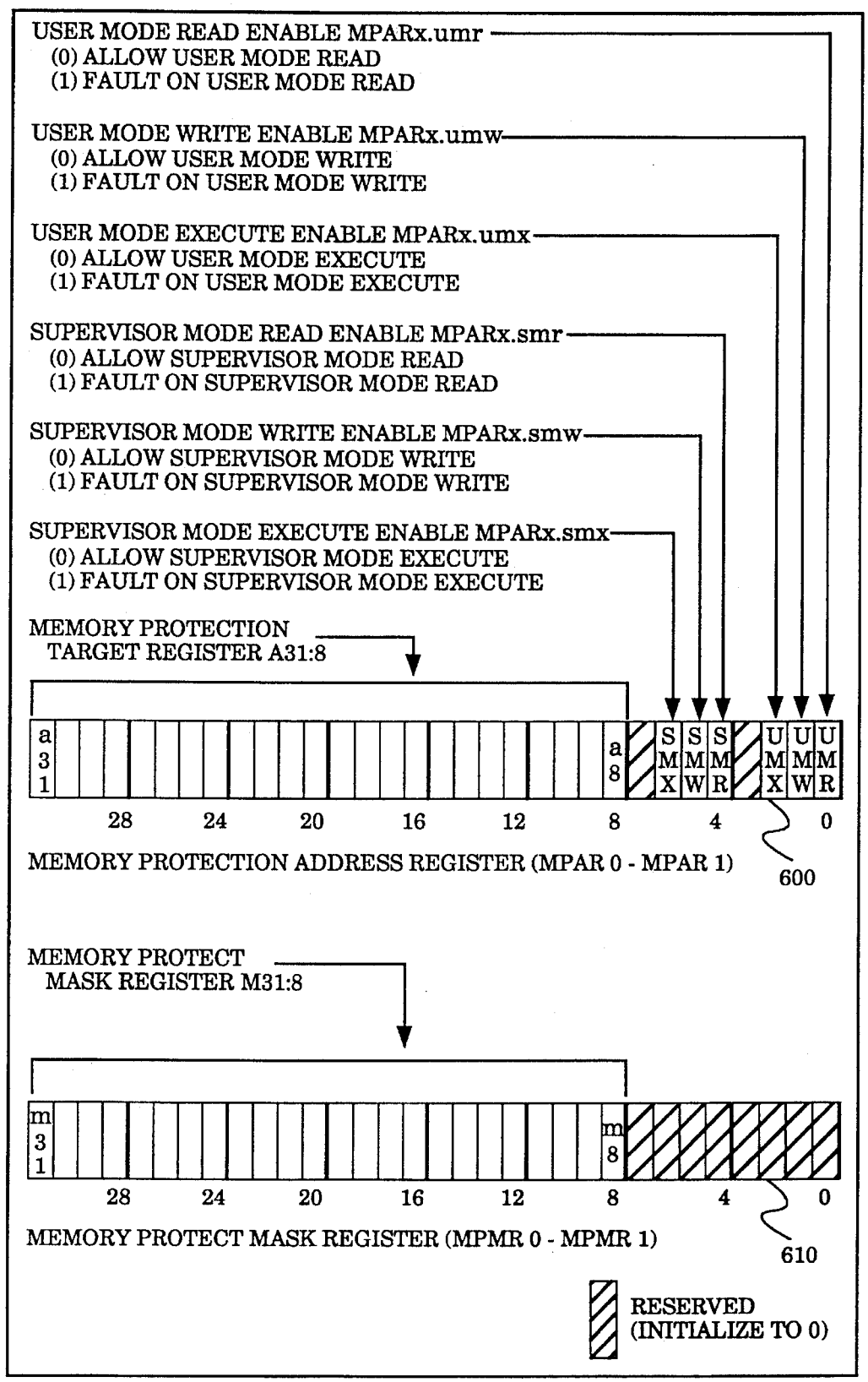
FIG. 7 is an illustration of one embodiment of the memory protect address registers utilized in the guarded memory unit of FIG. 4.

An embodiment of the memory protect address registers utilized in the present embodiment is shown in FIG. 7. In the present embodiment, the memory protect address registers include a register pair, memory protect address register 600 and a memory protect mask register 610. The memory protect address register 600 includes a plurality of bits allocated for identifying whether to permit certain mode memory operations, for example, user mode read, user mode write, user mode execute, supervisor mode read, supervisor mode write and supervisor mode execute. Each bit identifies if a certain mode generates a fault during the memory operation.

The register 600 further includes the base address that is to be protected, in the present embodiment, the base address is identified as the upper 20 bits of a 32-bit address. This has been found to provide sufficient resolution for the protection mechanism. However, it is readily apparent that the base address can be identified by 32 bits or higher, as appropriate for the memory utilized.

The memory protect mask register 610 provides mask bits which are used to determine the bits to compare to the address of the memory operation in order to determine whether a memory protection violation has occurred. This mask register 610 enables varying resolution of comparison to enhance the flexibility of the mechanism. FIG. 8 illustrates various block sizes that can be achieved by setting the appropriate mask value in the memory protect mask register.

Figure 9A:
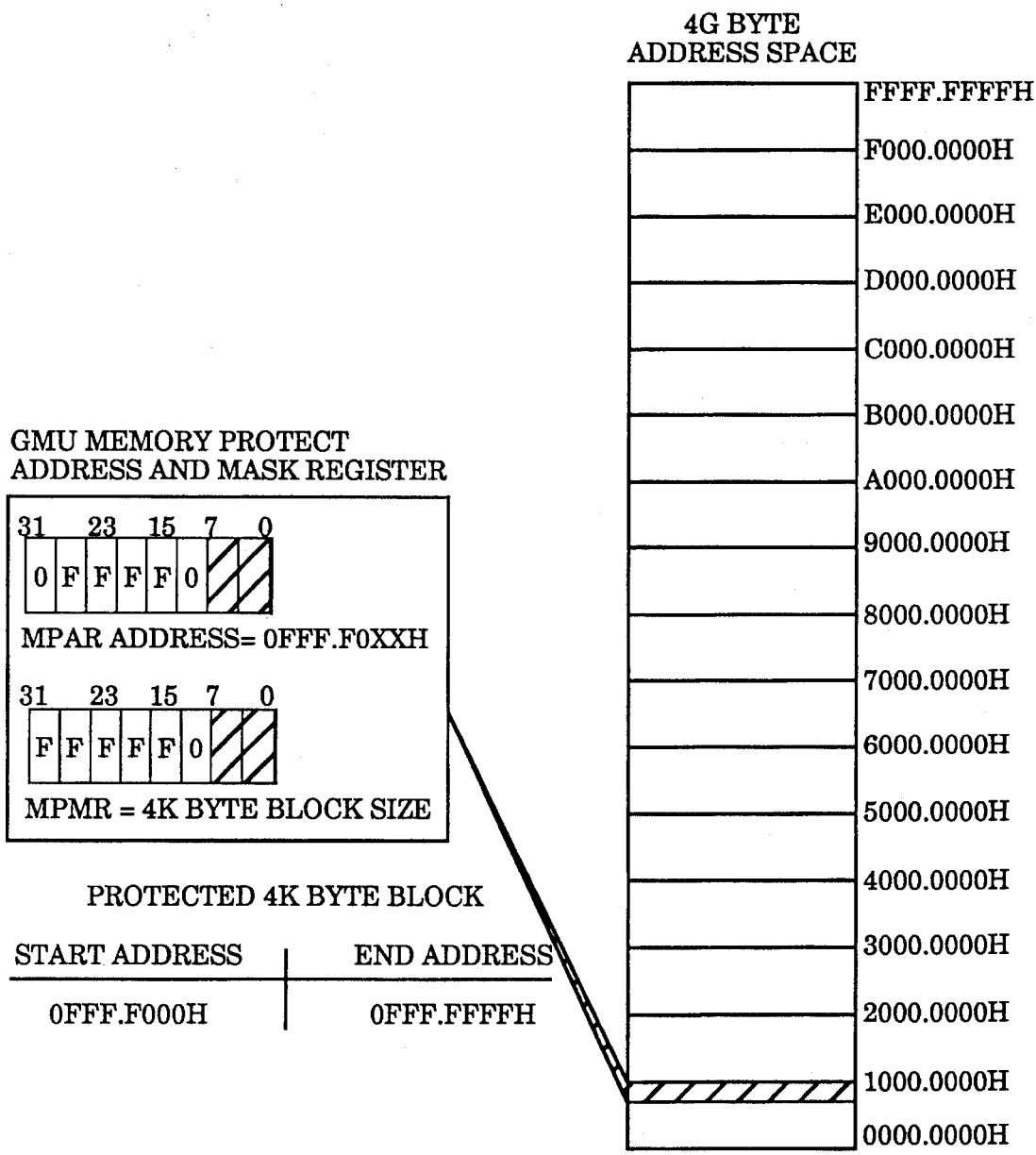
FIG. 9a illustrates an example of programming the address registers to protect against unauthorized accesses.
Figure 9B:
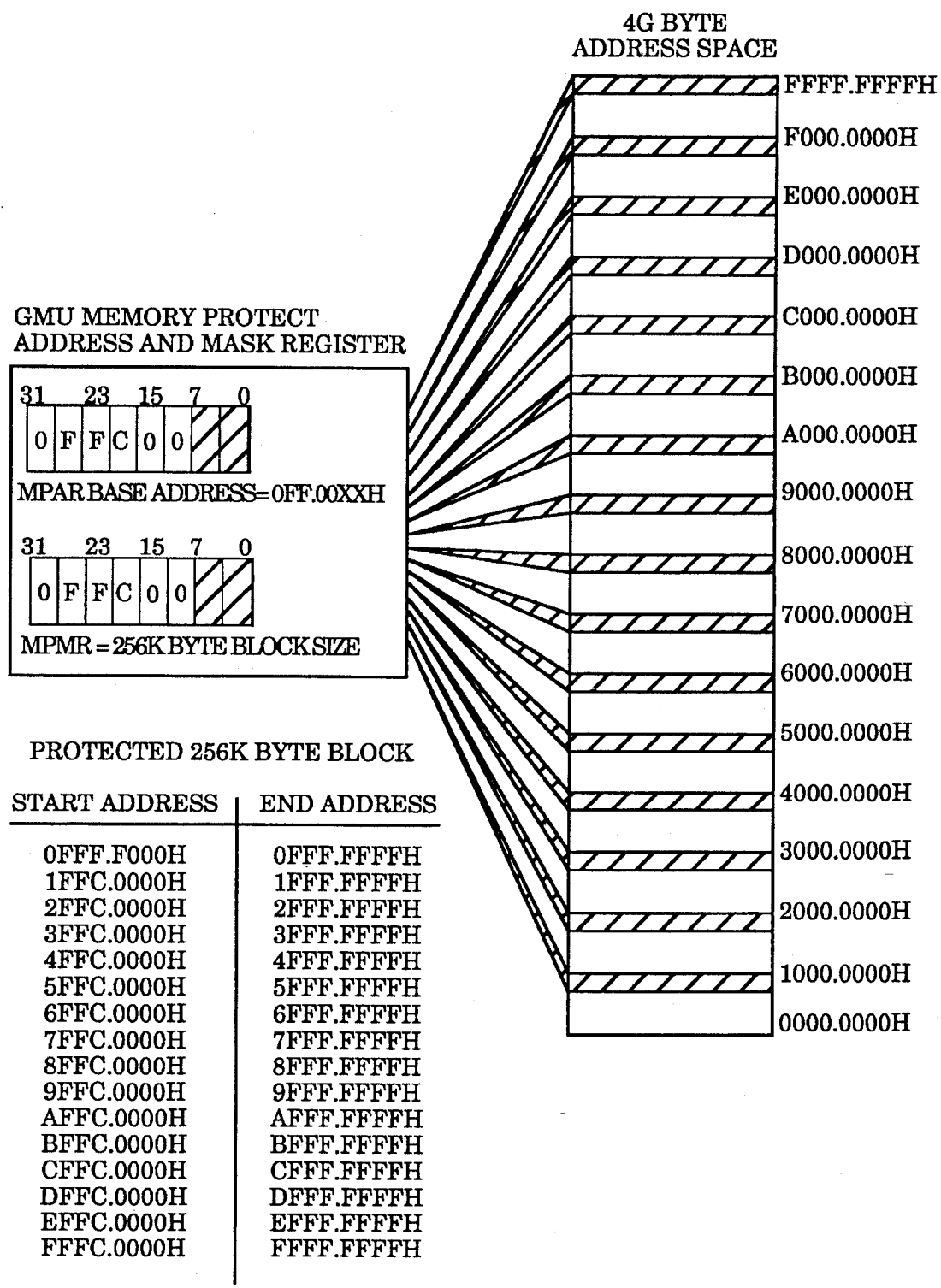
FIG. 9b is a second example showing the programming of the registers to protect against unauthorized address accesses.

FIG. 9a illustrates one example of an address protected in accordance with the present invention by setting the corresponding bits in the memory protect address register and memory protect mask register. FIG. 9b illustrates an alternate example in which the memory protect mask register is modified such that a plurality of addresses are protected in 256K byte blocks.

Figure 10:
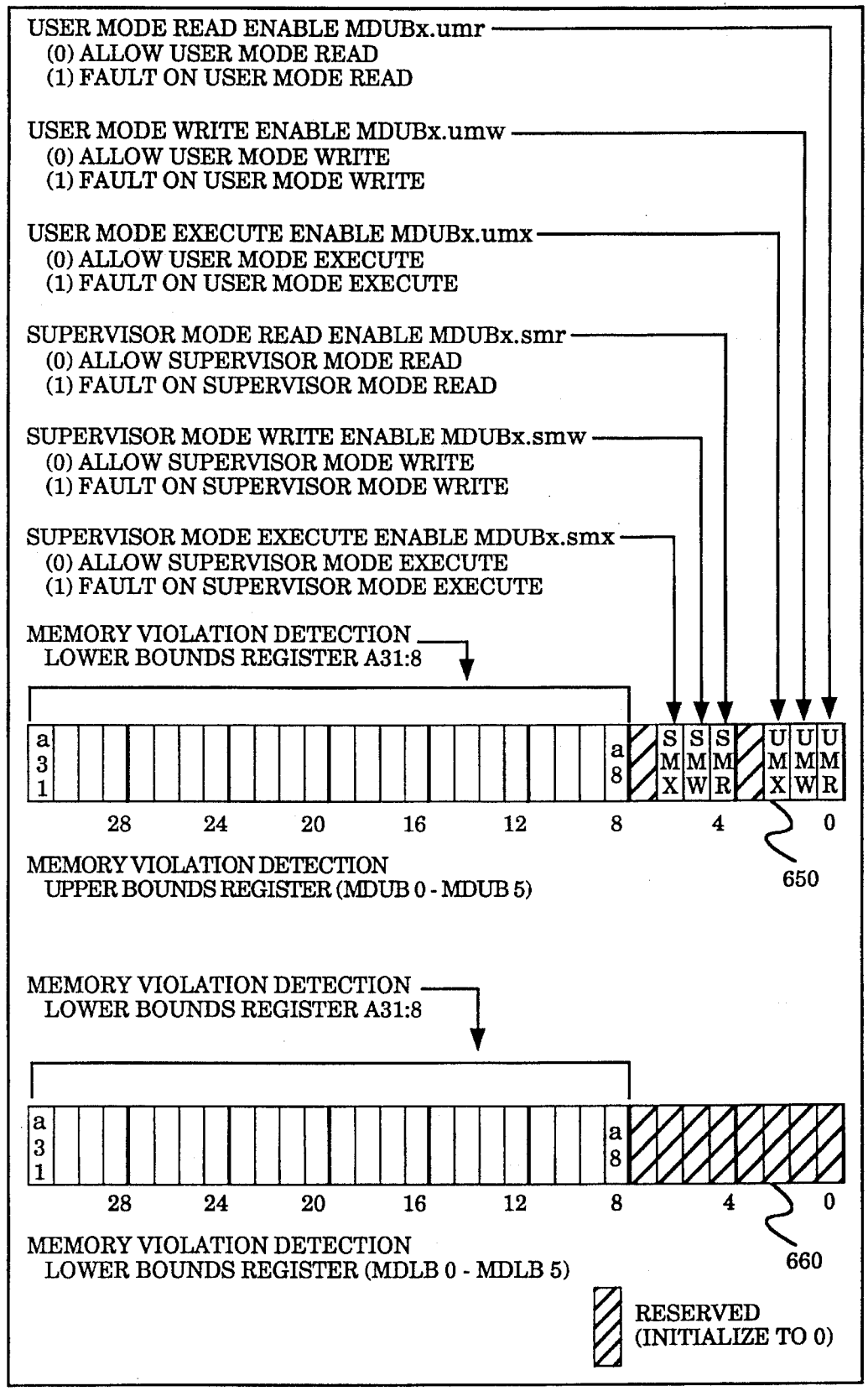
FIG. 10 illustrates the registers used for memory violation detection in accordance with the teachings of the present invention.

FIG. 10 illustrates one embodiment of the memory violation detection registers. Referring to FIG. 10, each set of registers comprise an upper bounds register 650 and a lower bounds register 660. The upper bounds register 650 identifies the upper bounds of a memory address range to be detected, specifically in the present embodiment, the upper 20 bits of the upper bounds are identified. The lower bounds register 660 identifies the lower bound address of the address range to be detected. It is readily apparent that the full 32 bits or, alternately, other resolutions may be utilized. The lower 8 bits of the register 650 identify the modes that are to be detected. These modes include, in the present embodiment, user mode read, user mode write, user mode execute, supervisor mode read, supervisor mode write, and supervisor mode execution.

It should be noted that, in the present embodiment, the configuration of the registers used for memory protection and memory detection are slightly different. The configurations differ slightly due to the time constraints imposed by the system. In particular, mask bits are utilized in conjunction with the address stored to identify applicable addresses for memory protection because the masking operation requires few clock cycles to complete. This is important because if a protection violation occurs the cancel signal must be issued as quickly as possible in order to insure the memory operation is halted before the memory is affected by the memory operation execution. A memory violation detection, however, does not issue a cancel signal and the memory operation is permitted to complete processing; a fault is simply reported. Therefore a more lengthy address matching process may be employed. By specifying the beginning and ending address of memory a finer resolution, at the cost of additional clock cycles to perform the address match, is achieved. It should be readily apparent to one skilled in the art that the configuration of registers used for memory protection could be used for memory detection and likewise the configurations of registers used for memory detection could also be used for memory protection. Furthermore, other configurations may be employed.

FIG. 11 illustrates an example of the memory detection registers and associated address detected in accordance with the teachings of the present invention. FIG. 11 shows a protected range of addresses and protectioned types of operations which will occur for the setting shown.

Figure 12:
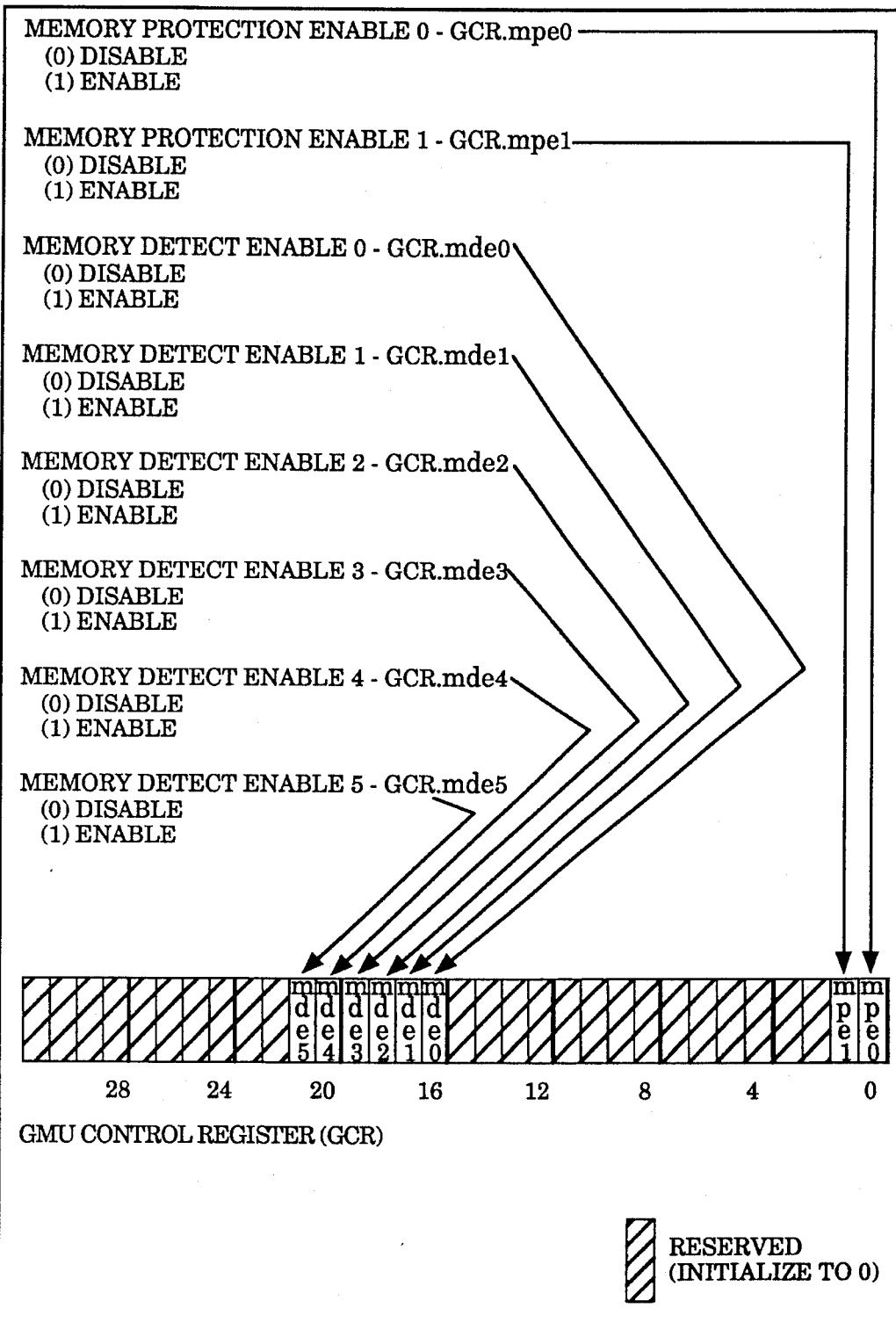
FIG. 12 illustrates an embodiment of the guarded memory unit control register utilized in the guarded memory unit of the embodiment shown in FIG. 4.

The memory registers also include a control register which provides some generalized settings that are applicable to both the protection and detection mechanisms of the system. In the present embodiment shown in FIG. 12, certain of the bits can be set or reset to enable and disable the corresponding memory protect and memory detect mechanisms.

Thus, an effective mechanism is provided for detecting and protecting against memory violations has been discussed. The invention has been described in conjunction with the preferred embodiment. However, it is evident that numerous alternatives, modifications, variations and uses will be apparent to those skilled in the art, in light of the foregoing description.

What is claimed is:

1. An non-intrusive apparatus for providing protection from memory access violations comprising:
   a plurality of memory protect address registers, each for storing a base memory address and attribute bits identifying unauthorized memory access operations;
   a monitor for reading any memory access request communicated on a memory bus coupled to a processor, the memory access request having an associated operational mode and access type, the monitor determining a memory address for each memory access request;
   a plurality of mask registers each associated with one of the memory protect address registers for storing mask bits, the mask bits for selectively determining a portion of the base memory addresses to be compared to a portion of the memory address to determine a match;
   a mode input for receiving signals indicative of an operational mode and access type for the memory access request; and
   a fault mode generation block providing a fault signal to the processor, the fault signal indicative of whether the memory access request is one of the unauthorized memory access operations to the protected range of memory as determined by the mask bits according to the operational mode and access type as determined by the attribute bits, the fault mode generation block further providing a cancel signal to a bus control unit coupled to the memory bus if the memory access request is one of the unauthorized memory access operations.

2. A non-intrusive method of providing protection from memory access violations comprising the steps of:
   a) monitoring a memory bus to detect a memory access request;
   b) determining a requested operational mode for the memory access request;
   c) determining an access type for the memory access request;
   d) determining a memory address from the memory access request;
   e) comparing the memory address to a stored base address for a determination whether the memory address is within a protected memory range, said determination accomplished by further performing the steps of:
i) masking the base address with mask bits to identify a portion of the base address to be compared;
ii) comparing the portion of the base address with a corresponding portion of the memory address to determine if a match occurs, said match indicating that the memory address is within the protected memory range;

f) performing the following steps if the memory address is within the protected memory range:

i) comparing the memory access mode and type of memory operation requested to stored attribute bits that indicate invalid modes of memory access and invalid memory operations for the protected memory range; and
ii) generating a fault signal to a processor coupled to the memory bus, if the memory access mode and the type of memory operation requested are identified as a memory access violation from the attribute bits;
iii) issuing a cancel signal to a bus control unit coupled to the memory bus to halt the memory access request.

* * * * *